Figure 3:
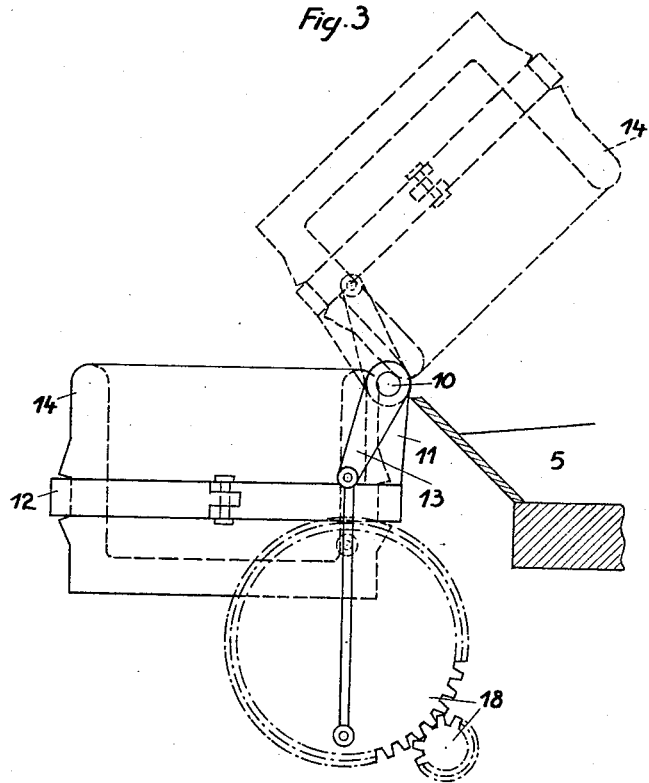

July 26, 1932. R. GENENGER 1,869,245
DEVICE FOR HANDLING AND EMPTYING GLASS MELTING POTS
Filed May 29, 1930 2 Sheets-Sheet 1
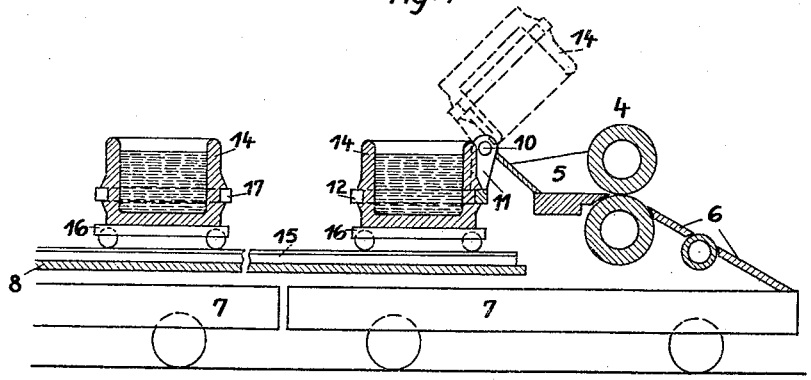
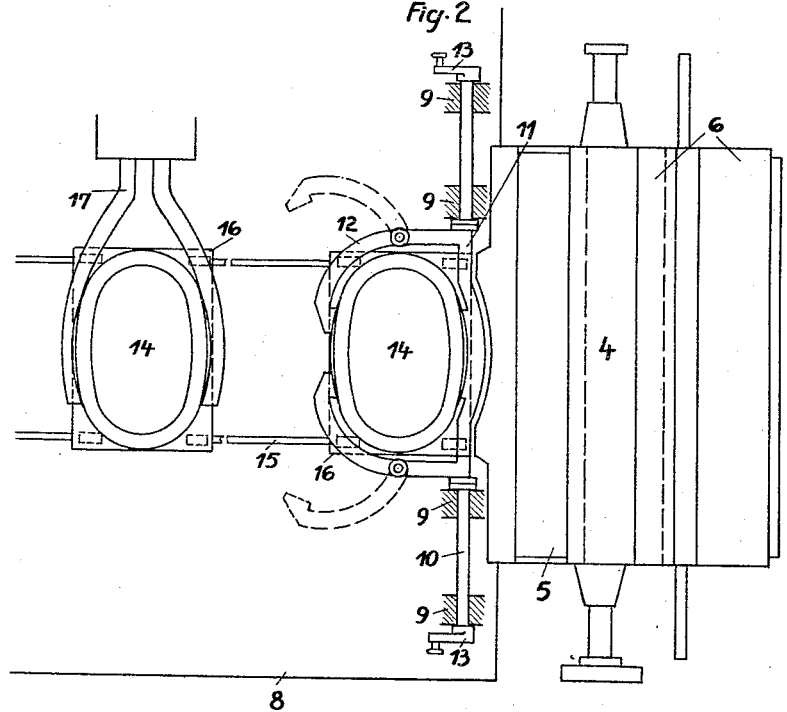
Inventor:
Richard Genenger
per
Attorney.

July 26, 1932.  R. GENENGER  1,869,245
DEVICE FOR HANDLING AND EMPTYING GLASS MELTING POTS
Filed May 29, 1930   2 Sheets-Sheet 2

Inventor:
Richard Genenger
per
Attorney.

Patented July 26, 1932

1,869,245

UNITED STATES PATENT OFFICE

RICHARD GENENGER, OF AACHEN-FORST, GERMANY, ASSIGNOR TO N. V. MAATSCHAPPIJ TOT BEHEER EN EXPLOITATIE VAN OCTROOIEN, OF THE HAGUE, NETHERLANDS

DEVICE FOR HANDLING AND EMPTYING GLASS MELTING POTS

Application filed May 29, 1930, Serial No. 457,061, and in Germany June 3, 1929.

This invention relates to the manufacture of high grade plate glass by pouring molten glass from a pot onto a casting or rolling table or onto a receiver or roll of a glass rolling machine on which it is brought into shape, and it has more particularly reference to the mode of handling the melting pot for the pouring out of the glass described in the patents to Max Bicheroux Nos. 1,673,098 and 1,673,138, according to which the pot is emptied "en masse" by positioning the pot near and aside of the table, receiver or other support and turning it as a whole about a horizontal axis located near the upper pouring edge of the pot and slightly above the support.

The invention has for its object to provide a simple and efficient device for accomplishing this mode of handling the pots and feeding them to the forming machine, the device essentially comprising a pair of pot gripping tongs attached to a cranked or offset portion of a horizontal tilting shaft fixedly mounted adjacent to the forming machine and travelling pot supporting and transporting means, such as trucks, conveying bands or the like, on which each pot after having been withdrawn from the furnace is deposited and run to the machine and into the tongs, by means of which it is emptied by tilting. The use of a pot feeding track and a stationary tilting device is more preferable than the known use of an overhead crane provided with a pot gripping and tilting fork. Travelling trucks or endless bands can be installed at lower costs than the so-called "casting cranes". Besides, this mode of feeding is less detrimental to the pots containing the heavy glass mass, because during the transport they rest as a whole on the travelling support, while with the use of a casting crane the pots are hanging free in the crane fork. Moreover, the dangers entailed by a breakage of a pot are smaller when the pot is supported on a truck, conveying band or the like than when it is suspended in an overhead crane.

An embodiment of the invention is illustrated, by way of example, in the accompanying drawings in which: Fig. 1 is a sectional side elevation of the device, Fig. 2 a plan view of the same, and Fig. 3 a detail view of a drive for the tilting shaft.

Referring to the drawings, 4 denotes a plate glass rolling machine, 5 is the receiver of the machine, and 6 is an inclined chute down which the plates are delivered to travelling transporting tables 7 which are designed to carry the plates to the lehr. Arranged in front of the machine is a platform 8 on which standards 9, Fig. 2, are arranged in which is mounted a tilting shaft 10 so as to extend along the free transverse edge of the receiver 5. This shaft 10 has an intermediate offset or cranked portion 11, to which is fastened a pair of pot gripping tongs 12. The tongs can be opened and closed in the manner indicated in Fig. 2. The shaft 10 has at its ends cranks 13 for turning the shaft. The offset portion 11 and the tongs 12 are of such a form and construction that when turning the shaft 10, a pot 14 held in the tongs will be tilted around a horizontal axis located in or near the pouring edge of the pot. Arranged to extend from the melting furnace, not shown, to the rolling machine are rails 15 on which wheeled trucks 16 designed to receive and carry the melting pots 14 are adapted to travel.

When a pot has to be brought to the rolling machine for being emptied into the same, it is withdrawn from the furnace by means of the customary furnace fork 17, Fig. 2, deposited on a truck 16 and run by means of the same into the tongs 12 which are open at that time. Thereupon, the tongs are closed and the pot, by turning the shaft 10, tilted into the position indicated by broken lines in Figs. 1 and 3. When the pot is completely empty, it is lowered again onto the truck 16, the tongs 12 are opened so as to release the pot and the truck with the pot on it is run back to the melting furnace.

The movement of the trucks can be effected in any well-known manner by electricity, steam or any other power.

Any approved means, such as a crank drive 18 shown in Fig. 3, can be used for turning the tilting shaft 10.

The journals of the tilting shaft are preferably adjustable relatively to the cranked portion 11 for varying the location of the tilting axis of the pot with relation to the pouring edge of the same. Besides, the tilting shaft is also adjustable laterally, i. e. horizontally, for changing its position with relation to the machine.

The device described can also be used in connection with casting tables and with rolling machines not having a receiver.

Instead of the trucks 16, there may as well be used endless bands or any other transporting means suited for the purpose in question.

Having thus described my invention, what I claim as new and desire to secure by Letters Patent is:—

In a device to manufacture a sheet glass, the combination with a plate forming machine comprising a glass receiver and a pair of forming rollers, of a pot handling device comprising a horizontal shaft mounted for rotation in bearings having a fixed relation to the receiver and gripping members on the shaft for receiving and holding a glass pot, and means for delivering a glass pot into position to be engaged by said gripping members to permit the pot to be removed from the delivering device and to be tilted over the receiver.

In testimony whereof I have signed my name to this specification.

RICHARD GENENGER.